United States Patent [19]

Berger

[11] 3,759,969

[45] Sept. 18, 1973

[54] ORGANOSILICON COMPOUND WITH ISOTHIOCYANATE SUBSTITUENT BONDED THROUGH DIVALENT BRIDGE

[75] Inventor: Abe Berger, Schenectady, N.Y.

[73] Assignee: General Electric Company, Waterford, N.Y.

[22] Filed: June 9, 1971

[21] Appl. No.: 151,549

Related U.S. Application Data

[63] Continuation-in-part of Ser. No. 796,647, Jan. 31, 1969, Pat. No. 3,646,089.

[52] U.S. Cl. 260/448.2 N, 260/448.8 R, 260/448.2 E
[51] Int. Cl. ............................. C07f 7/08, C07f 7/18
[58] Field of Search ............... 260/448.2 N, 448.8 R

[56] References Cited
UNITED STATES PATENTS

| | | | |
|---|---|---|---|
| 2,762,826 | 9/1956 | Noll | 260/448.2 N |
| 3,466,314 | 9/1969 | Moedritzer et al. | 260/448.2 N |
| 3,646,089 | 2/1972 | Berger | 260/448.2 N X |

Primary Examiner—Daniel E. Wyman
Assistant Examiner—Paul F. Shaver
Attorney—Donald J. Voss, E. Philip Koltos, Frank L. Neuhauser and Oscar B. Waddell

[57] ABSTRACT

A new class of organosilicon compounds having an isothiocyanate group bonded to the silicon atom through an alkylene bridge of at least three carbon atoms, or an alkylene bridge having sulfur oxygen or nitrogen linkages therein is made by reacting the corresponding amino alkyl-substituted organosilicon compound with carbon disulfide and a dialkyl carbodiimide. The compositions are extremely useful where base cleavage of the silicon atom from the isothiocyanate substituted group is a problem, such as glass sizing where the glass is basic and the formation of polyurethanes where a base catalyst is implied.

3 Claims, No Drawings

ORGANOSILICON COMPOUND WITH ISOTHIOCYANATE SUBSTITUENT BONDED THROUGH DIVALENT BRIDGE

RELATED APPLICATIONS

This application is a continuation-in-part of the copending application of Abe Berger, Ser. No. 796,647, filed Jan. 31, 1969 now U.S. Pat. No. 3,646,089 and is related to the copending application of Abe Berger, Ser. No. 788,960, filed Jan. 3, 1969, now U.S. Pat. No. 3,642,855.

BACKGROUND OF THE INVENTION

Prior Art

Organosilicon compounds having alkyl isocyanate substituents are known in the art and can be produced easily by the addition of a chlorosilicon hydride across the olefinic double bond of an olefinic isocyanate, employing platinum catalysis. However, attempts to make the corresponding alkyl isothiocyanates have been unsuccessful, possibly because of the poisoning effect of the sulfur in the isothiocyanate on the platinum catalyst. Organosilicon isothiocyanates have been prepared according to the method described in U.S. Pat. No. 3,178,391 - Holtschmidt el al., but, while the isothiocyanate group is bonded to a carbon atom, the thus substituted carbon group is bonded to the silicon atom through an oxysilicon linkage. As is well known, such linkages are not as stable as the silicon-carbon linkage.

In addition, triorganosilylmethylisothiocyanates are made by the decomposition of the dithiocarbamic acid as is shown in U.S. Pat. No. 2,762,826 - Noll. Again, when the isothiocyanate group is separated from the silicon atom by only one carbon atom such linkages are not as stable as when the isothiocyanate radical is separated by three or more carbon atoms. Stability against cleavage is of great importance in such application as sizing glass fibers wherein the glass fiber surface contains alkali metal oxides rendering it extremely basic and in the formation of polyurethane foams where a basic catalyst is employed.

Similarly, while dithiocarbamyl-substituted organosilicon compounds have been prepared, where the dithiocarbamyl group is linked to the silicon atom through an alkylene bridge, this process has not proven adaptable to the formation of isothiocyanates. A process for forming these dithiocarbamyl-substituted organosilicon compounds is shown in U.S. Pat. No. 2,938,046 - Morehouse. Thus, the prior art has not produced stable, isothiocyanate-substituted organosilicon compounds where the isothiocyanate is substituted through a bridge which includes a silicon-carbon bond. These materials are extremely useful in the production of particularly advantageous polyurethanes.

BRIEF DESCRIPTION OF THE INVENTION

The present invention is directed to organosilicon materials having an isothiocyanate group connected to the silicon atom through a bridge having a silicon-carbon bond and having the formula:

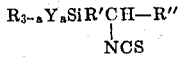

where R is selected from the class consisting of alkyl, aryl, aralkyl, alkaryl, cyanoalkyl, cyanoaryl, and dialkylamino groups; R' is a divalent radical selected from the class consisting of alkylene, oxyalkylene, sulfalkylene, and iminoalkylene radicals, where each oxygen, sulfur, and —NH— group is attached to two carbon atoms, and when R' is an alkylene radical there is at least a three carbon bridge between the isothiocyanato group and the silicon; R'' is a monovalent radical selected from the class consisting of alkyl, alkyleneoxyalkyl, alkylenesulfalkyl, alkyleneimino-alkyl, and hydrogen, where each oxygen, sulfur, and —NH— group is attached to two carbon atoms, the total number of carbon atoms between R' and R'', combined, being from 0 to 20; Y is a lower alkoxy group; and $a$ is from 0 to 3.

These organosilicon materials are prepared by reacting an organosilicon compound, substituted through a bridge, with a silicon-carbon bond with an amine group, with carbon disulfide and a dialkyl carbodiimide according to the reaction:

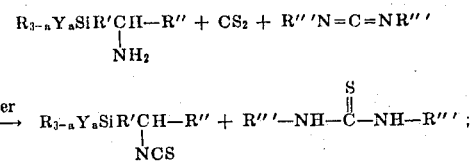

where R is an organic group of not more than 18 carbon atoms selected from the class consisting of alkyl, aryl, aralkyl, alkaryl, cyanoalkyl, cyanoaryl, and dialkylamine radicals; R' is selected from the class consisting of alkylene having 3 to 15, oxyalkylene, thioalkylene, and iminoalkylene, where each oxygen, sulfur, or —NH— group is attached to two carbon atoms; R'' is selected from the class consisting of alkyl, alkyleneoxyalkyl, alkylenethioalkyl, and alkylene-azaalkyl and hydrogen, where each oxygen, sulfur, and —NH— group is attached to two carbon atoms, the total number of carbon atoms in R' and R'', combined, being from 0 to 20; Y is a lower ($C_1$-$C_4$) alkoxy group; R''' is selected from the class consisting of alkyl and cycloalkyl radicals of from one to 10 carbon atoms; and $a$ is from 0 to 3.

The reaction is carried out in the presence of an ether solvent at temperatures of from 0° to 30°C. Reaction time is generally from 2 to 3 hours after which the thiourea precipitates, indicating completion of the reaction. The product can then be recovered by a flash distillation.

DESCRIPTION OF THE PREFERRED EMBODIMENTS

According to the present invention, an organo-silicon compound having an amine substituent attached to the silicon atom through a bridge having a silicon-carbon bond is reacted with carbon disulfide and a dialkyl carbodiimide in the presence of an ether to yield an organo-silicon compound having an isothiocyanate group, similarly bridged to the silicon compound through a bridge having a silicon-carbon bond according to the reaction of equation:

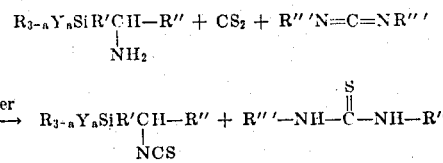

Among the radicals which R represents are alkyl radicals such as methyl, ethyl, propyl, butyl, octyl, dodecyl, isopropyl, isobutyl, etc.; cycloalkyl radicals such as cyclohexyl, cyclopentyl, cycloheptyl, etc.; arly radicals such as phenyl, biphenyl, naphthyl, benzoylphenyl, paraphenoxyphenyl, tolyl, xylyl, etc.; aralkyl radicals such as benzyl, phenethyl, etc.; cyano-substituted radicals such as cyanomethyl, alpha-cyanoethyl, beta-cyanoethyl, beta-cyanopropyl, gamma-cyanopropyl, cyanophenyl, etc.; and dialkyl amine radicals such as dimethyl amine. The preferred substituents represented by R are monovalent alkyl radicals of from one to seven carbon atoms.

R' represents alkylene radicals such as ethylene, propylene, dodecylene, etc.; and alkylene chains with a hetero atom linkage, such as:

$$-(CH_2)_3-O-(CH_2)_2-$$
$$-(CH_2)_2-O-(CH_2)_6-$$
$$-(CH_2)_4-S-(CH_2)_5-$$
$$-(CH_2)_2-S-(CH_2)_8-$$
$$-(CH_2)_3-NH-(CH_2)_3-$$
$$-(CH_2)_6-NH-(CH_2)_4-, \text{etc.}$$

The radicals represented by R'' are monovalent and similar to those represented by R' and include such alkyl substituents as methyl, ethyl, butyl, isopropyl, isobutyl, etc.; and monovalent radicals having a hetero atom linkage, such as:

$$-(CH_2)_2-O-CH_3$$
$$-(CH_2)-O-C_2H_5$$
$$-(CH_2)_3-S-CH_3$$
$$-(CH_2)_4-S-C_3H_8$$
$$-(CH_2)-NH-CH_3$$
$$-(CH_2)_5-NH-C_4H_9, \text{etc.}$$

The alkyl and cycloalkyl radicals represented by R''' include methyl, ethyl, propyl, decyl, cyclopentyl, cyclohexyl, etc. Y is a lower alkoxy group and includes methoxy, ethoxy, isopropoxy, etc.

The reaction between the organosilicon atom with the amine group linked through a bridge having a silicon-carbon bond, the carbon disulfide, and the dialkyl carbo-diimide is carried out in the presence of an ether solvent. The three reactants are generally present in stoichiometric amounts, though there can be a 10 percent excess, based upon the stoichiometric requirements of either. The carbon disulfide can be present in an excess of as much as 30 mole per cent, based upon the stoichiometric.

The solvents employed in the reaction are ethers, including both alkyl and cyclic ethers. Preferably, the reaction is carried out in tetrahydrofuran, though ethyl ether and other ethers can also be employed. The total of the three reactants generally comprises from about 20 to 60 percent by weight of the ether solvent employed. Initially, each of the reactants is soluble in the ether solvent, but following reaction, the thiourea precipitates from the solvent.

The reaction is generally carried out at a temperature of from 0° to 30°C and the order of addition of the reactants to the reaction mixture is immaterial. The time of reaction is generally from about 2 to 3 hours and then, as previously noted, the thiourea precipitates from the solution. This is an indication that the reaction is complete. The solids are then filtered from the reaction mixture, the solvent, stripped, and the reaction mixture fractionated. Additionally, a flash distillation can be employed to purify the organosilicon compound now having the isothiocyanate group linked through a bridge having a silicon-carbon bond.

The products which can be formed according to the present invention include the following:

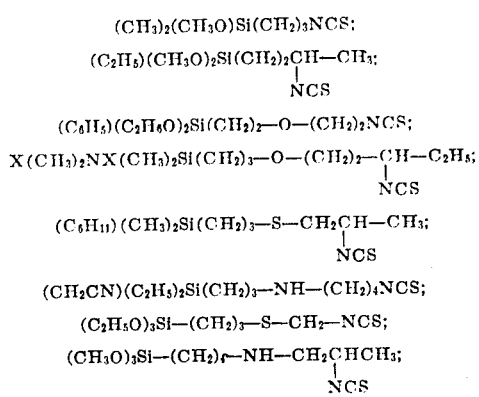

This list should, of course, not be considered exhaustive of the possible compounds to be formed according to the present invention.

The formation of the materials of the present invention, according to the process of the invention, will now be described in greater detail in the following examples. These examples should be considered as illustrative only, and not as limiting in any way the full scope of the invention as covered in the appended claims. All parts in the following examples are by weight.

EXAMPLE 1

Into a reaction vessel were placed 90 parts of dry tetrahydrofuran, 21.1 parts N,N'-dicyclohexylcarbodiimide, and 12.5 parts of carbon disulfide. The reaction mixture was cooled to 10°C employing an external refrigerant. After the reaction mixture had reached the desired temperature, a quantity of 14.7 parts of aminopropyldimethylmethoxysilane was added, dropwise, and a mild exotherm was noted. When about one-half of this organosilane had been added, the reaction mixture became cloudy and a precipitate of dicyclohexylthiourea began to precipitate. After completion of the organosilane addition, the reaction mixture was warmed to room temperature and the dicyclohexylthiourea which had formed was removed by filtration. The tetrahydrofuran and excess carbon disulfide were removed by an atmospheric distillation and the remaining reaction product was then fractionated. The desired product distilled at 81°C and 0.5 mm. pressure and a vapor phase chromatography scan indicated a purity of approximately 98%. An infrared scan, with absorption at 4.52 and 4.7 microns, characteristic of —NCS absorption, was consistent with the structure:

$(CH_3)_2(CH_3O)Si(CH_2)_3NCS$.

EXAMPLE 2

A quantity of 21.1 parts N,N'-dicyclohexylcarbodiimide, 12.5 parts carbon disulfide, and 90 parts of dry tetrahydrofuran was placed into a reaction vessel and the mixture was cooled to 10°C employing an external refrigerant. A quantity of 23.7 parts of aminopropoxypropyltrimethoxysilane was then added to the reaction mixture, dropwise, and a mild exotherm was noted. The temperature of the reaction mixture was maintained at 10°C ± 5°C by controlling the rate of addition of the organosilane. After the addition was completed, the reaction mixture was allowed to warm to room temperature and after about one-half hour, the mixture became cloudy and a precipitate of dicyclohexylthiourea appeared. The reaction mixture was allowed to remain in the vessel for an additional 3 hours after which the dicyclohexylthiourea was separated by filtration and the tetrahydrofuran removed by atmospheric distillation. The remaining reaction mixture was then fractionated and the product was collected at 125°–126°C at 0.3 mm. as a colorless oil. A vapor phase chromatography scan showed a purity of approximately 99 percent and the infrared scan was consistent with the structure:

$(CH_3O)_3Si(CH_2)_3O(CH_2)_3NCS$.

EXAMPLE 3

When the aminopropoxypropyltrimethoxysilane employed in Example 2 is replaced with a corresponding amount of $(C_6H_5)(C_2H_5O)_2Si(CH_2)_2NH(CH_2)_2NH_2$, the product:

$(C_6H_5)(C_2H_5O)_2Si(CH_2)_2NH(CH_2)_2NCS$, results.

EXAMPLE 4

When the aminopropoxypropyltrimethoxysilane of Example 2 is replaced with an equivalent quantity of:

$((CH_3)_2N)(CH_3)_2Si(CH_2)_2-S-CH_2-\underset{\underset{NH_2}{|}}{CH}-CH_3$, the product:

$((CH_3)_2N)(CH_3)_2Si(CH_2)_2-S-CH_2-\underset{\underset{NCS}{|}}{CH}-CH_3$ results.

EXAMPLE 5

When the aminopropyldimethoxysilane of Example 1 is replaced with an equivalent quantity of:

$(C_2H_5)_3Si(CH_2)_3-\underset{\underset{NH_2}{|}}{CH}-C_3H_7$ the product:

$(C_2H_5)_3Si(CH_2)_3-\underset{\underset{NCS}{|}}{CH}-C_3H_7$ results.

The products produced according to the process of the present invention are valuable starting materials in the preparation of polythiourethanes through isothiocyanate additions. The plastics which are thus produced can be either porous or non-porous and, according to their form, can be used as gears, diaphragms, and as cushioning materials.

What I claim is:

1. Organosilicon materials having an isothiocyanate group connected to the silicon atom through a bridge having a silicon-carbon bond and having the formula, $R_{3-a}Y_aSiR'\underset{\underset{NCS}{|}}{CH}-R''$ where R is an alkyl radical of 1 – 7 carbon atoms, R' is a divalent oxyalkylene radical of up to 20 carbon atoms, where each oxygen group is attached to two carbon atoms, R'' is hydrogen, Y is a lower alkoxy group; and $a$ is from 0 to 3.

2. The compound of claim 1 wherein R is methyl and R' is $-(CH_2)_3-O-(CH_2)_2-$.

3. The compound of claim 1 wherein R is ethyl and R' is $-(CH_2)_2-O-(CH_2)_2-$.

* * * * *